US007738362B2

(12) United States Patent
Kakiuchi

(10) Patent No.: US 7,738,362 B2
(45) Date of Patent: Jun. 15, 2010

(54) SYSTEM AND METHOD FOR ADDRESS NOTIFICATION IN A NETWORK

(75) Inventor: Motofumi Kakiuchi, Tokyo (JP)

(73) Assignee: NEC Infrontia Corporation, Kanagawa (JP)

(*) Notice: Subject to any disclaimer, the term of this patent is extended or adjusted under 35 U.S.C. 154(b) by 477 days.

(21) Appl. No.: 11/730,201

(22) Filed: Mar. 30, 2007

(65) Prior Publication Data
US 2007/0230333 A1 Oct. 4, 2007

(30) Foreign Application Priority Data
Mar. 31, 2006 (JP) ............... 2006-101039

(51) Int. Cl.
 H04L 12/26 (2006.01)
(52) U.S. Cl. .................. 370/217; 370/221; 370/242
(58) Field of Classification Search ......... 370/216–228, 370/242–245, 352–356, 392
See application file for complete search history.

(56) References Cited

U.S. PATENT DOCUMENTS

| 7,161,897 | B1 * | 1/2007 | Davies et al. ............... 370/217 |
| 2004/0172574 | A1 * | 9/2004 | Wing et al. .................... 714/4 |
| 2004/0257983 | A1 * | 12/2004 | Kopp et al. ................ 370/217 |
| 2005/0273645 | A1 * | 12/2005 | Satran et al. ................... 714/4 |
| 2006/0153068 | A1 * | 7/2006 | Dally et al. ................. 370/219 |

FOREIGN PATENT DOCUMENTS

| JP | 11-308236 | 11/1999 |
| JP | 2004-186766 | 7/2004 |
| JP | 2004-328604 | 11/2004 |

* cited by examiner

Primary Examiner—Ricky Ngo
Assistant Examiner—Wei-Po Kao
(74) Attorney, Agent, or Firm—Young & Thompson

(57) ABSTRACT

A network system includes a service providing apparatus; first and second backup apparatuses, each of which is configured to back up at least a part of a function of the service providing apparatus, and is connected with the service providing apparatus through a WAN; and a terminal connected with the service providing apparatus and the first and second backup apparatuses, and configured to receive a service from the service providing apparatus in a normal operation. The service providing apparatus has IP addresses of itself, the first and second backup apparatuses and the terminal, and notifies the IP addresses of the service providing apparatus and the first backup apparatus to the terminal in response to registration of the IP address of the terminal. The terminal holds the IP addresses of the service providing apparatus and the first backup apparatus, and registers the IP address of the terminal on the first backup apparatus based on the IP address of the first backup apparatus to receive a service from the first backup apparatus, when knowing a communication failure with the service providing apparatus.

10 Claims, 3 Drawing Sheets

SYSTEM AND METHOD FOR ADDRESS NOTIFICATION IN A NETWORK

BACKGROUND OF THE INVENTION

1. Field of the Invention

The present invention relates to address notification, and more particularly relates to an address notifying technique in a network system and a method of notifying an address of a backup apparatus in an IP (Internet Protocol) telephony.

2. Description of the Related Art

As one of features in an IP telephony system, there is a point that a service can be provided from one point to a plurality of sites which are far away. Since this configuration is employed, it is possible to attain integrated management of data. However, simultaneously with this, the service cannot be provided even when any of network apparatuses other than a server and a terminal is failed. For this reason, a backup apparatus is installed in a necessary location in order to continue to provide the service even when the network apparatus is failed.

A method of using this backup apparatus will be described below. At a time of a normal operation, a VoIP (Voice over Internet Protocol) service providing apparatus belonging to a LAN (Local Area Network) provides the service for all terminals containing terminals belonging to the above LAN and terminals belonging to other LANs connected through WAN (Wide Area Network) to the above LAN. Here, the terminal implies an apparatus such as an IP telephone, all the kinds of terminal apparatuses used in the IP telephony, and a Gateway apparatus for conversion between IP channel and a conventional channel.

Now, it is supposed that a failure has occurred in the WAN so that a communication between a VoIP service providing apparatus and a terminal belonging to a LAN cannot be carried out. At this time, if the terminal belonging to the LAN previously obtains an IP address of a VoIP service backup unit or apparatus installed in the other LAN from the VoIP service providing apparatus, the terminal can continue to receive the service from the VoIP service backup apparatus by performing re-registration to the VoIP service backup apparatus.

In the normal operation, it is necessary that the LANs at the respective sites are normal when the WAN is failed. However, a network trouble is not simple, and there is a possibility that the trouble has a spreading compositely. For example, a case could be considered that a failure has occurred in another LAN so that a communication between the VoIP service backup apparatus and a terminal belonging the other LAN is impossible. In such a case, the terminal cannot receive the service even if the VoIP service providing apparatus is provided. At this time, the terminal cannot receive the service, even if there is the VoIP service backup apparatus belonging to another LAN.

In conjunction with the above description, Japanese Laid Open Patent Application (JP-P 2004-186766A) discloses a backup controller. In this conventional example, the backup controller automatically backs up in a remote station, a controller which centrally controls a voice exchange between a plurality of IP telephones in at least one remote station through an IP network. This backup controller has a failure monitoring section, a first automatic switching section and a second automatic switching section. In accordance with a reception state of a periodical transmission signal from a controller or a reception state of an allowable response for the periodical transmission signal to the controller, if those reception states reach a predetermined failure reference, the failure monitoring section determines that a failure has occurred. Moreover, after the failure is determined to have occurred, if those reception states reach a predetermined recovery reference, it is determined that the failure is recovered. If the failure monitoring section determines that the failure is has occurred, the first automatic switching section disconnects the IP telephone in the remote station from the controller, and registers it as a self-extension terminal to set it to be usable. Then, the IP telephone can carry out transmission/reception to/from an extension or a station line. If the failure monitoring section determines that the failure has been recovered, the second automatic switching section disconnects the IP telephone that is registered as the self-extension terminal and made usable, and then re-connects to the controller.

Also, Japanese Laid Open Patent Application (JP-P2004-328604A) discloses an IP telephony service system. In this conventional example, the IP telephony service system in which an IP telephony service providing apparatus provided in a main network is used to attain an IP telephony service for an IP terminal, The main network has an IP telephony service providing apparatus for providing an IF telephony service to an IP terminal; and a first database that is linked with the IP telephony service providing apparatus and stores a service data provided to the IP terminal. Inside a plurality of sub-networks, there are an IP telephony service backup apparatus for providing an IP telephony service, when a communication with the IP telephony service providing apparatus in the main network through the IP terminal becomes impossible; and a second database that is linked with the IP telephony service backup apparatus and stores service data provided to the IP terminal by the IP telephony service backup apparatus.

Also, Japanese Laid Open Patent Application (JP-A-Heisei, 11-308236) discloses an emulated LAN apparatus. In this conventional example, the emulated LAN apparatus is provided with an LES/BUS server and an LAN emulation client. The server is composed of a currently-used server and a spare server, and the client holds an ATM address table corresponding to each server, and when a failure of the currently-used server is detected, its connection is switched to the spare server.

SUMMARY OF THE INVENTION

It is therefore an object of the present invention to provide a network system and an IP address notifying method, in which a backup apparatus can be automatically and suitably selected that is used at a time of a network failure in an IP telephony system.

Another object of the present invention is to provide a network system and an IP address notifying method, in which a backup apparatus suitable for a terminal can be specified to minimize a possibility of a service stop.

In an aspect of the present invention, a network system includes a service providing apparatus; first and second backup apparatuses, each of which is configured to back up at least a part of a function of the service providing apparatus, and is connected with the service providing apparatus through a WAN; and a terminal connected with the service providing apparatus and the first and second backup apparatuses, and configured to receive a service from the service providing apparatus in a normal operation. The service providing apparatus has IP addresses of itself, the first and second backup apparatuses and the terminal, and notifies the IP addresses of the service providing apparatus and the first backup apparatus to the terminal in response to registration of the IP address of the terminal. The terminal holds the IP addresses of the service providing apparatus and the first backup apparatus, and registers the IP address of the terminal on the first backup apparatus based on the IP address of the first backup apparatus to receive a service from the first backup apparatus, when knowing a communication failure with the service providing apparatus.

Here, the service providing apparatus may notify the IP address of the second backup apparatus as at least one substitution backup apparatus to the terminal when knowing a communication failure with the first backup apparatus. The terminal may hold the IP address of the second backup apparatus in place of the IP address of the first backup apparatus, and register the IP address of the terminal on the second backup apparatus based on the IP address of the second backup apparatus to receive a service from the second backup apparatus, when knowing the communication failure with the service providing apparatus.

Also, the terminal may communicate with the first backup apparatus periodically to detect the communication failure with the first backup apparatus, and notify the detection of the communication failure with the first backup apparatus to the service providing apparatus.

Also, the service providing apparatus may have an IP address list of the IP addresses of a plurality of backup apparatuses including the first and second backup apparatuses, and transmit the IP address list to the terminal in response to the notice of the detection of the communication failure with the first backup apparatus from the terminal. The terminal may check a response time of each of the plurality of backup apparatuses other than the first backup apparatus based on the IP address list, and notify the check result to the service providing apparatus. The service providing apparatus may select the second backup apparatus as the at least one substitution backup apparatus from among the plurality of backup apparatuses and notifies the IP address of the second backup apparatus to the terminal.

Also, the service providing apparatus may belong to a first LAN, the first and second backup apparatuses may belong to second and third LANs, respectively, and connected with the first LAN through the WAN. The terminal may belong to a fourth LAN connected with the first to third LAN through the WAN.

Also, the service providing apparatus may be a VoIP service providing apparatus in a VoIP telephony system.

In another aspect of the present invention, a service providing apparatus includes a communicating section configured to communicate with a terminal and a plurality of backup apparatuses which contain first and second backup apparatuses and each of which backs up at least a part of a function of the service providing apparatus; and a storage section configured to store an IP addresses list of the plurality of backup apparatuses. The service providing apparatus further includes a processing section configured to receive registration of IP addresses from the terminal and the plurality of backup apparatuses through the communicating section, to notify the IP address of the first backup apparatus to the terminal through the communicating section in response to the registration of the IP address of the terminal.

Here, the processing section may notify the IP address of the second backup apparatus as at least one substitution backup apparatus to the terminal through the communicating section when knowing a communication failure with the first backup apparatus.

Also, the processing section may transmit the IP address list to the terminal through the communicating section in response to a request from the terminal based on detection of the communication failure with the first backup apparatus, and select the second backup apparatus as the at least one substitution backup apparatus from among the plurality of backup apparatuses based on a check result of a response time of each of the plurality of backup apparatuses other than the first backup apparatus, to notify the IP address of the second backup apparatus to the terminal through the communicating section.

Also, the service providing apparatus may be a VoIP service providing apparatus in a VoIP telephony system.

Also, each of the plurality of backup apparatuses may have a same function as the service providing apparatus.

In still another aspect of the present invention, an address notifying method in a network system is achieved by holding an IP address of a service providing apparatus, and registering IP addresses of a terminal and a plurality of backup apparatuses containing first and second backup apparatuses on the service providing apparatus; by notifying the IP addresses of the service providing apparatus and the first backup apparatus to the terminal in response to the registration of the IF address of the terminal such that the IP addresses of the service providing apparatus and the first backup apparatus are held by the terminal; by providing a service from the service providing apparatus to the terminal in a normal operation; and by registering the IP address of the terminal on the first backup apparatus based on the IP address of the first backup apparatus to receive a service from the first backup apparatus, when a communication failure with the service providing apparatus has occurred.

Here, the address notifying method may be achieved by further notifying the IP address of the second backup apparatus as at least one substitution backup apparatus from the service providing apparatus to the terminal when a communication failure with the first backup apparatus has occurred, holding the IF address of the second backup apparatus in place of the IP address of the first backup apparatus in the terminal; and registering the IP address of the terminal on the second backup apparatus based on the IP address of the second backup apparatus to receive a service from the second backup apparatus, when the communication failure with the first backup apparatus has occurred.

Also, the address notifying method may be achieved by further detecting the communication failure with the first backup apparatus by the terminal by communicating with the first backup apparatus periodically; and notifying the detection of the communication failure with the first backup apparatus from the terminal to the service providing apparatus.

Also, the address notifying method may be achieved by further transmitting an IP address list from the service providing apparatus to the terminal in response to the notice of the detection of the communication failure with the first backup apparatus, wherein the IP address list contains the IP addresses of a plurality of backup apparatuses including the first and second backup apparatuses; checking a response time of each of the plurality of backup apparatuses other than the first backup apparatus based on the IP address list; notifying the check result of the response times from the terminal to the service providing apparatus; selecting the second backup apparatus as at least one substitution backup apparatus from among the plurality of backup apparatuses in the service providing apparatus; and notifying the IP address of the second backup apparatus to the terminal.

Also, the service providing apparatus belongs to a first LAN, and the first and second backup apparatuses belong to second and third LANs, respectively, and connected with the first LAN through the WAN. The terminal belongs to a fourth LAN connected with the first to third LAN through the WAN.

Also, the service providing apparatus may be a VoIP service providing apparatus in a VoIP telephony system.

In still yet another aspect of the present invention, a computer-readable software product achieves an address notifying method. The method is achieved by receiving registration of IP addresses from a terminal and a plurality of backup apparatuses which contain first and second backup apparatuses and each of which backs up at least a part of a function of the service providing apparatus; and by notifying the IP addresses of a service providing apparatus and the first backup apparatus to the terminal in response to the registration of the IP address of the terminal.

Here, the method may be achieved by further notifying the IP address of the second backup apparatus as at least one substitution backup apparatus from the service providing apparatus to the terminal when knowing a communication failure with the first backup apparatus.

Also, the method may be achieved by further transmitting an IP address list from the service providing apparatus to the terminal in response to a request from the terminal based on detection of the communication failure with the first backup apparatus, the IP address list containing the IP addresses of the plurality of backup apparatuses; and selecting the second backup apparatus as the at least one substitution backup apparatus from among the plurality of backup apparatuses based on a check result of a response time of each of the plurality of backup apparatuses other than the first backup apparatus, to notify the IP address of the second backup apparatus from the service providing apparatus to the terminal.

DESCRIPTION OF THE PREFERRED EMBODIMENTS

Hereinafter, a network system of the present invention will be described in detail with reference to the attached drawings.

First Embodiment

Figure 1:
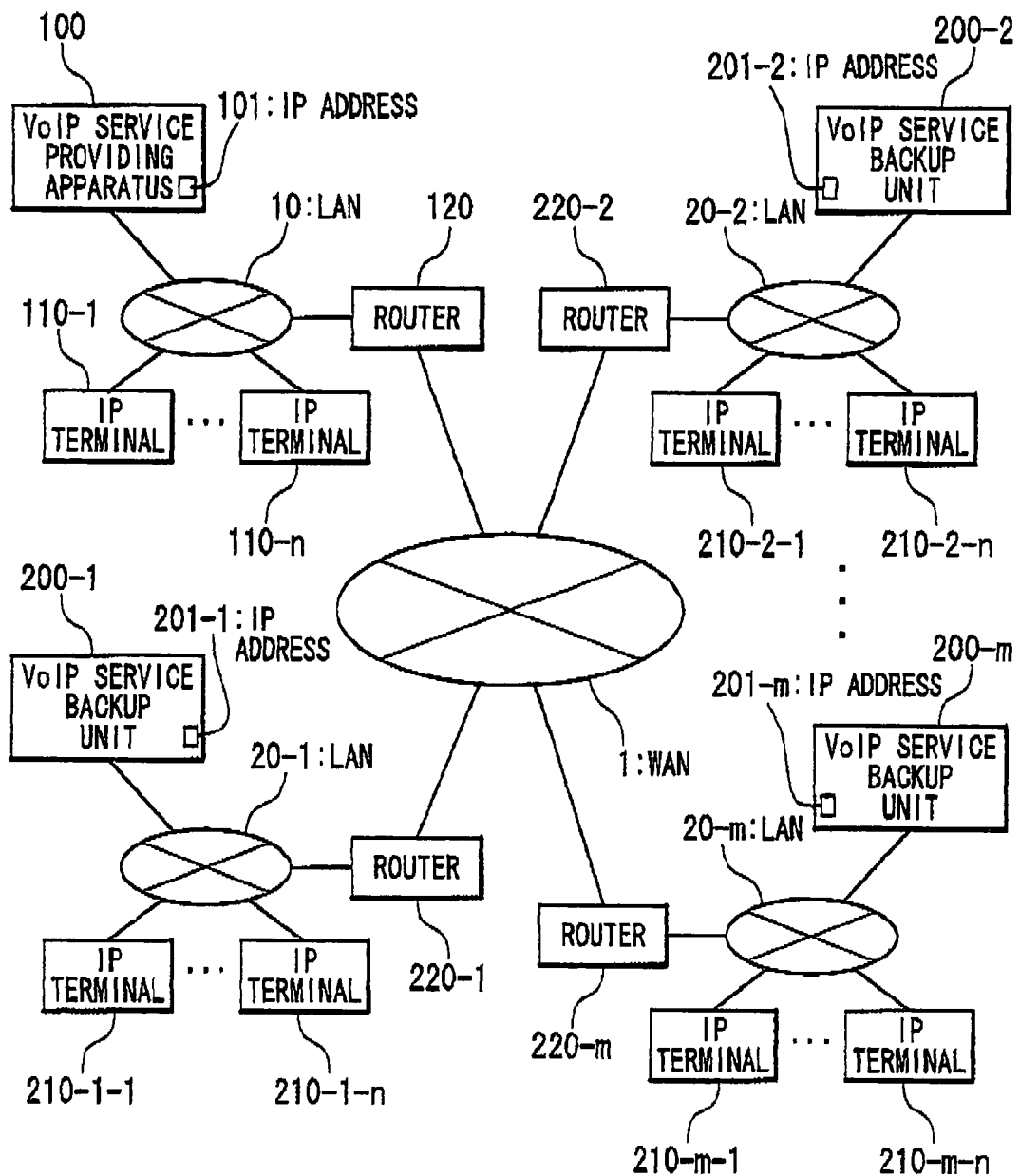
FIG. 1 is a conceptual diagram showing a configuration of a network system according to an embodiment of the present invention.

As shown in FIG. 1, a network system of the present invention includes a WAN 1, a LAN 10, LANs 20 (20-j, j=1, 2, ..., m), a VoIP service providing apparatus 100, terminals 110 (110-i, i=1, 2, ..., n), a router 120, a VoIP service backup units or apparatuses 200-j, terminal 210 (210-j-k, k=1, 2, ..., n), and routers 220-j.

The WAN 1 is a wide area network to connect terminals such as computers, which are located at geographically separate points, to allow transmission and reception of data. The WAN 1 is, for example, the Internet, a telephone communication line network and a dedicated line network. Each of the LAN 10 and the LAN 20-j is a narrow area and small scale communication network in a company or a home.

The VoIP service providing apparatus 100 belongs to the LAN 10, and assigned with an IP address 101. Also, the VoIP service providing apparatus 100 has an IP address list indicating IP addresses of the VoIP service backup apparatuses 200-j, and IP addresses of the terminals 110-i and 200-j-k. The terminals 110-i belong to the LAN 10, and carry out communication by using the IP addresses. For example, the terminals 110-i are such as a computer, an IP telephone, an intelligent home electrical appliance, a game machine, and a home server. However, the terminals are not limited to those examples. Each of the routers 220-j relays communication data between the WAN 1 and the LAN 20-j.

Each of the VoIP service backup apparatuses 200-j belongs to a corresponding one of the LANs 20-j. Also, each of the VoIP service backup apparatuses 200-j is assigned with the IP address 201-j. Also, the VoIP service backup apparatus 200-j have an IP address list indicating the IP address of the VoIP service providing apparatus 100 and the IP addresses 201-j of the VoIP service backup apparatuses 200-j. The terminals 210-j-k belong to the LAN 20-j, and carry out communication by using the IP addresses. For example, the terminal 210-j-k is such as a computer, an IP telephone, an intelligent home electrical appliance, a game machine and a home server. However, the terminal is not limited to those examples. Each of the routers 220-j relays communication data between the WAN 1 and a corresponding one of the LANs 20-j.

It should be noted that a case that an IP address is not fixedly assigned but dynamically assigned by DHCP (Dynamic Host Configuration Protocol) will be described. When the IP addresses are assigned to the VoIP service providing apparatus 100 and the VoIP service backup apparatus 200-j, it is necessary to notify an updated or newly assigned IP addresses to all the terminals 110-i and 210-j-k receiving the service from them. The notice of the IP address is issued to all the terminals 110-i and 220-j-k by each of the VoIP service providing apparatus 100 and the VoIP service backup apparatuses 200-j when communication is established between the apparatus and the terminal after change or new assigning of the IP address, Or, the VoIP service backup apparatuses 200-j notify the dynamically changed IP address to the VoIP service providing apparatus 100, and the VoIP service providing apparatus 100 collectively manages the changed IP addresses and notifies to all of the terminals 110 and 210.

Next, an example of the network system of the present invention will be described below by exemplifying a case that the number of IP addresses that can be registered in each terminal is 2.

The IP address of the terminal 210-j-k is registered in the VoIP service providing apparatus 100 at the time of a normal operation and the terminal 210-j-k receives a service from the VoIP service providing apparatus 100, When the IP address of the terminal 210-j-k is registered in the VoIP service providing apparatus 100, the terminal 210-j-k receives the IP address of the VoIP service backup apparatus 200-1 from the VoIP service providing apparatus 100. The VoIP service backup apparatus 200-1 is the most suitable for the terminal 210-j-k, if the VoIP service providing apparatus 100 and the LAN are normal. The VoIP service backup apparatus 200-1 is selected as a re-registration destination at a time of a communication failure with the VoIP service providing apparatus 100. At this time, the selected VoIP service backup apparatus 200-1 may not always belong to the same LAN as the terminal 210-j-k that is registered on the VoIP service providing apparatus 100.

The terminal 210-j-k periodically communicates with the VoIP service providing apparatus 100 and the VoIP service backup apparatus 200-1 during the normal operation and checks to confirm the states of them. Here, it is supposed that the communication failure between the terminal 210-j-k and the VoIP service backup apparatus 200-1 is detected by the terminal 210-j-k.

The service to the terminal 210-j-k is continued because the communication with the VoIP service providing apparatus 100 is normal. However, if the communication with the VoIP service providing apparatus 100 is also failed, the service to the terminal 210-j-k is stopped. For this reason, the terminal 210-j-k notifies the communication failure with the VoIP service backup apparatus 200-1 to the VoIP service providing apparatus 100 and requests an IP address list of the variable VoIP service providing apparatuses 200-j. The VoIP service providing apparatus 100 sends the list of the IP addresses of the VoIP service backup apparatuses 200-2 to 200-m other than the VoIP service backup apparatus 200-1 to the terminal 210-j-k.

The terminal 210-j-k checks a response time of each of the VoIP service backup apparatuses 200-2 to 200-m with regard to the connection to each of the VoIP service backup apparatuses based on the IP address list. Then, the terminal 210-j-k sends the check result to the VoIP service providing apparatuses 100. The VoIP service providing apparatus 100 considers the number of terminals assigned to each of the VoIP service backup apparatuses in the list, and a band of the line used for the connection between the sites, in accordance with the check result from the terminal 210-j-k, and re-selects an optimal one of the VoIP service backup apparatuses, for example, the VoIP service backup apparatus 200-2, and then notifies the IP address 201-2 of the VoIP service backup apparatus 200-2 to the terminal 210-j-k.

The terminal 210-j-k receives the notice and stores this IP address 201-2 therein as a backup registration destination when the communication with the VoIP service providing apparatus 100 is failed. Thus, a continuous operation is carried out.

Figure 2:
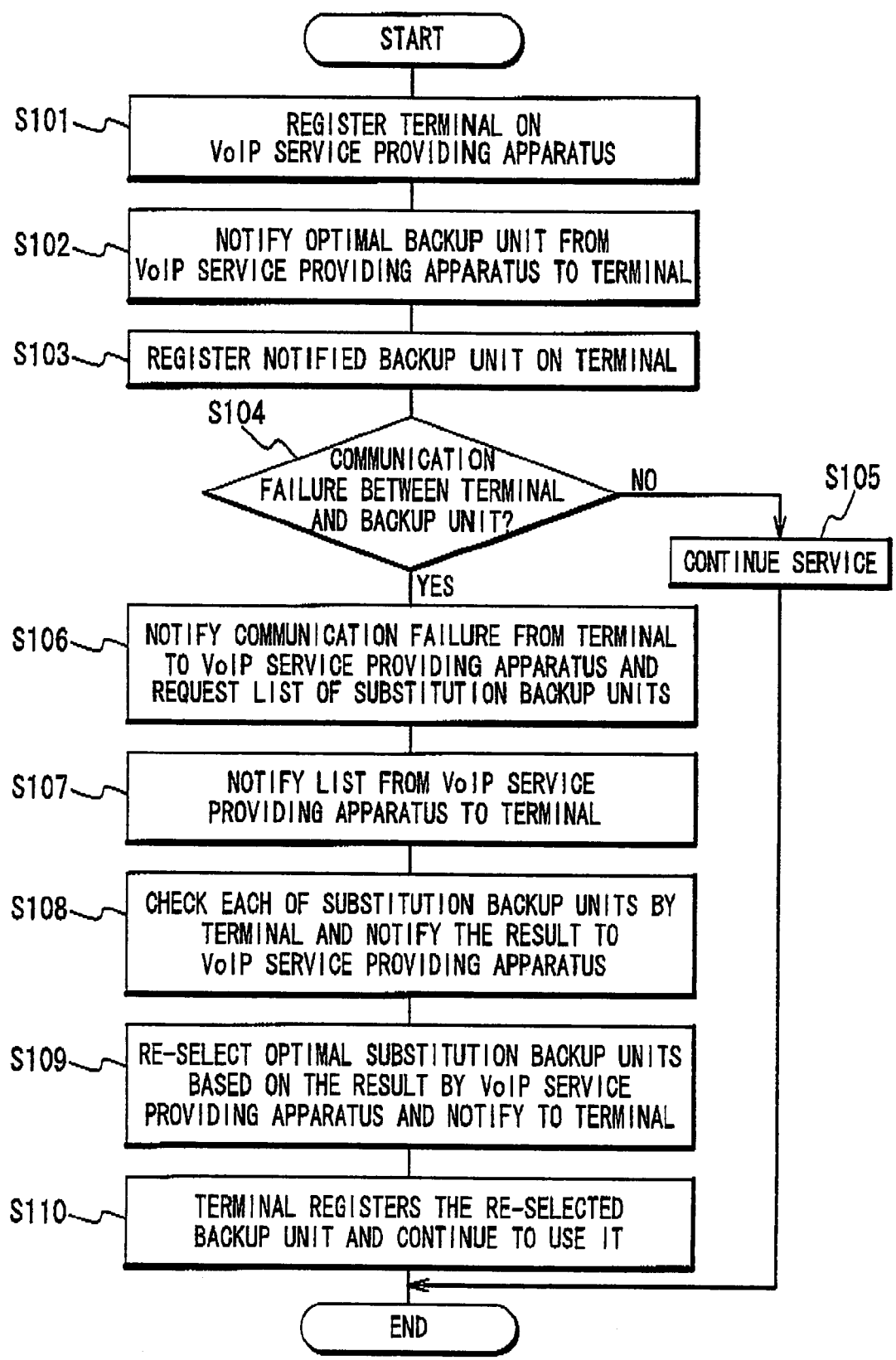
FIG. 2 is a flowchart showing a process flow of the network system in the present invention.

The process flow of the network system according to the present invention will be described below with reference to FIG. 2.

(1) Step S101

The IP address of the terminal 210-j-k is registered on the VoIP service providing apparatus 100 in order for the terminal 210-j-k to receive a service at the time of the normal operation.

(2) Step S102

When being registered on the VoIP service providing apparatus 100, the terminal 210-j-k receives the IP address of the VoIP service backup apparatus 200-1 from the VoIP service providing apparatus 100. The VoIP service backup apparatus 200-1 is selected as an optimal apparatus by the VoIP service providing apparatus 100.

(3) Step S103

The terminal 210-j-k registers the VoIP service backup apparatus 200-1 herein as a re-registration destination of the IP address of the terminal 210-j-k when the communication with the VoIP service providing apparatus 100 is failed, (4) Step S104

The terminal 210-j-k periodically communicates with the VoIP service backup apparatus 200-1 in the normal operation and checks whether or not the VoIP service backup apparatus 200-1 is normally operated.

(5) Step S105

If the VoIP service backup apparatus 200-1 is in the normal state, the communication with the VoIP service backup apparatus 200-1 is normal. Thus, the service to the terminal 210-1 is continued.

(6) Step S106

However, if the communication failure between the terminal 210-j-k and the VoIP service backup apparatus 200-1 is detected by the terminal 210-j-k and the communication with the VoIP service providing apparatus 100 in this state is also failed, the service to the terminal 210-j-k is stopped. For this reason, when detecting the communication failure with the VoIP service backup apparatus 200-1, the terminal 210-j-k notifies the communication failure with the VoIP service backup apparatus 200-1 to the VoIP service providing apparatus 100 and requests the IP address list of the variable VoIP service backup apparatuses.

(7) Step S107

The VoIP service providing apparatus 100 sends the IP address list of the VoIP service backup apparatuses 200-2 to 200-m other than the variable VoIP service backup apparatus 200-1 to the terminal 210-1.

(8) Step S108

The terminal 210-j-k checks a response time of each of the VoIP service backup apparatuses 200-2 to 200-m with regard to the connection to terminal 210-j-k and notifies the check result to the VoIP service providing apparatus 100. That is, the communication speed with each of the VoIP service backup apparatuses 200-2 to 200-m is checked, and the check result is notified to the VoIP service providing apparatus 100. It should be noted that as for the once-checked VoIP service backup apparatus 200, the check result may be stored and notified to the VoIP service providing apparatus 100. Consequently, the check may not be performed thereon from a next time.

(9) Step S109

The VoIP service providing apparatus 100 considers the number of the terminals assigned to each of the VoIP service backup apparatuses 200-2 to 200-m and the band of the line used for the connection between the sites, in accordance with the notified check result from the terminal 210-j-k. The VoIP service providing apparatus 100 re-selects an optimal one of the VoIP service backup apparatuses 200-2 to 200-m based on the consideration result. In this example, the optimal apparatus is the VoIP service backup apparatus 200-2. The VoIP service providing apparatus 100 notifies the IP address 201 of the VoIP service backup apparatus 200-2 to the terminal 210-j-k.

(10) Step S110

The terminal 210-1 receives the notice and stores the IP address 201-2 of the VoIP service backup apparatus 200-2 as a backup registration destination when the communication with the VoIP service providing apparatus 100 is failed. Thus, the operation is continued.

Figure 3:
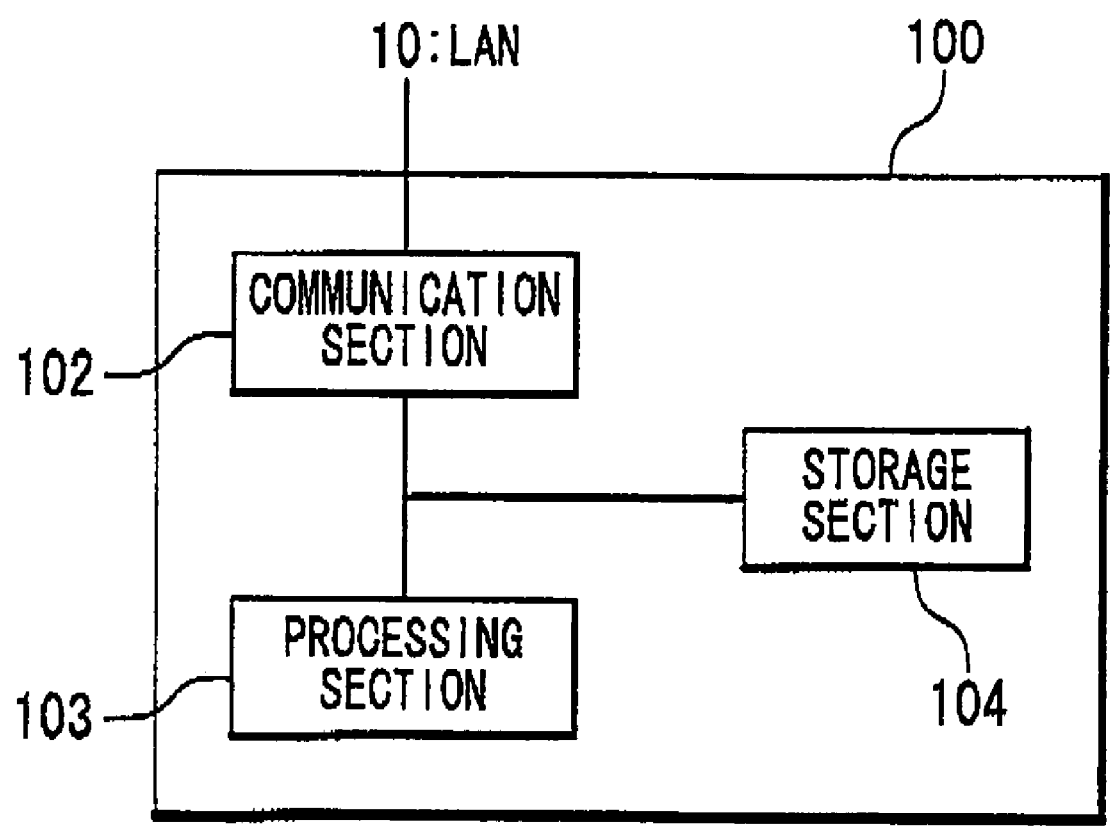
FIG. 3 is a block diagram showing a configuration of a VoIP service providing apparatus.

An example of the configuration of the VoIP service providing apparatus will be described below with reference to FIG. 3. The VoIP service providing apparatus 100 contains a communicating section 102, a processing section 103 and a storage section 104.

The communicating section 102 communicates with the LAN 10, and NIC (Network Interface Card) is exemplified. The IP address 101 is assigned to this NIC. That is, if there are a plurality of NICs, there are a plurality of IP addresses 101. The processing section 103 executes processes of the present invention such as the provision of the service and notification of the IP addresses. That is, the processing section 103 executes the programs for carrying out these processes. As the processing section 103, CPU is exemplified. The storage section 104 stores the data required to provide the service and the programs for executing the processes of the present invention. As the storage section 104, a memory or hard disc is exemplified. A recording medium or external storage is allowable. The data required to provide the service includes the content provided as the service and the IP address list used in the present invention. However, actually, there is a case that the content is provided by a different server. In such a case, the VoIP service providing apparatus 100 is not required to hold the content. The IP address of the server providing this content may be reported to the terminal side.

It should be noted that the configuration of the VoIP service backup apparatus 200 is desired to be similar to the configuration of the VoIP service providing apparatus 100. In case of the same configuration, when the communication with the VoIP service providing apparatus 100 is failed, the VoIP service backup apparatus 200 can function instead of the VoIP service providing apparatus 100.

Second Embodiment

Next, the network system according to the second embodiment of the present invention will be described below. The number of the servers that can be registered on the terminal side may be 3 or more. In this case, the VoIP service providing apparatus 100 can send the IP addresses of the VoIP service backup apparatuses as preferable apparatuses, to which priority orders are assigned, in accordance with the check result of the connection. That is, when the number of the IP addresses of the servers that can be registered by each terminal is 3 or more, each terminal registers the IP addresses in the order starting from the high priority order.

For example, in the description of the above embodiment, if the terminal 210-j-k detects and knows the communication failure between the terminal 210-j-k and the VoIP service backup apparatus 200-1, the VoIP service providing apparatus 100 notifies the IP address list to the terminal 210-j-k, when re-selecting the optimal one of the VoIP service backup apparatuses 200-2 to 200-m, which are arranged in the order starting from the optical apparatus. The order at this time is assumed to be the priority order. The terminal 210-j-k determines the backup registration destination when the communication with the VoIP service providing apparatus 100 is failed, in accordance with the priority order in the notified IP address list. When detecting the communication failure of the VoIP service backup apparatus 200-1 having the highest priority order, the terminal 210-j-k selects the VoIP service backup apparatus 200 having the next highest priority order. Or, the backup registration destination when the communication with the VoIP service providing apparatus 100 is failed is determined in accordance with a preset priority order, in spite of whether or not it is optimal. At this time, the priority order is considered to be able to be freely set.

In the above description, the terminal communicates with the VoIP service backup apparatus periodically to check the state of the VoIP service backup apparatus. However, the VoIP service providing apparatus 100 may communicate with the VoIP service backup apparatus periodically, instead of the terminal. In this case, when the VoIP service providing apparatus 100 detects the communication failure with the VoIP service backup apparatus, the VoIP service providing apparatus 100 may select the optimal substitution backup apparatus based on the check result and the like and notify an IP address of the optimal substitution backup apparatus to the terminal.

It should be noted that in the foregoing description, the IP address is used as the data to specify the VoIP service providing apparatus 100 and the VoIP service backup apparatuses 200. Actually, they are not limited to the IP-address. Instead of the IP address, the identification data indicating the VoIP service providing apparatus 100 and the VoIP service backup apparatus 200 may be used.

Also, the above has been described under the assumption that the function for checking the connection exists inside the VoIP service providing apparatus. However, as a different apparatus, it may exist outside.

What is claimed is:

1. A network system comprising:
a service providing apparatus;
first and second backup apparatuses, each of which is configured to back up at least a part of a function of said service providing apparatus, and is connected with said service providing apparatus through a WAN; and
a terminal connected with said service providing apparatus and said first and second backup apparatuses, and configured to receive a service from said service providing apparatus in a normal operation,
wherein said service providing apparatus has IP addresses of itself, said first and second backup apparatuses and said terminal, and notifies the IP addresses of said service providing apparatus and said first backup apparatus to said terminal in response to registration of the IP address of said terminal, and
said terminal holds the IP addresses of said service providing apparatus and said first backup apparatus, and registers the IP address of said terminal on said first backup apparatus based on the IP address of said first backup apparatus to receive a service from said first backup apparatus, when knowing a communication failure with said service providing apparatus,
said service providing apparatus notifies the IP address of said second backup apparatus as at least one substitution backup apparatus to said terminal when knowing a communication failure with said first backup apparatus, and
said terminal holds the IP address of said second backup apparatus in place of the IP address of said first backup apparatus, and registers the IP address of said terminal on said second backup apparatus based on the IP address of said second backup apparatus to receive a service from said second backup apparatus, when knowing the communication failure with said service providing apparatus,
said terminal communicates with said first backup apparatus periodically to detect the communication failure with said first backup apparatus, and notifies the detection of the communication failure with said first backup apparatus to said service providing apparatus,
said service providing apparatus has an IP address list of the IP addresses of a plurality of backup apparatuses including said first and second backup apparatuses, and transmits said IP address list to said terminal in response to the notice of the detection of the communication failure with said first backup apparatus from said terminal,
said terminal checks a response time of each of said plurality of backup apparatuses other than said first backup apparatus based on said IP address list, and notifies the check result to said service providing apparatus, and
said service providing apparatus selects said second backup apparatus as said at least one substitution backup apparatus from among said plurality of backup apparatuses and notifies the IP address of said second backup apparatus to said terminal.

2. The network system according to claim 1, wherein said service providing apparatus belongs to a first LAN,
said first and second backup apparatuses belong to second and third LANs, respectively, and connected with said first LAN through said WAN, and
said terminal belongs to a fourth LAN connected with said first to third LAN through said WAN.

3. The network system according to claim 2, wherein said service providing apparatus is a VoIP service providing apparatus in a VoIP telephony system.

4. A service providing apparatus comprising:
- a communicating section configured to communicate with a terminal and a plurality of backup apparatuses which contain first and second backup apparatuses and each of which backs up at least a part of a function of said service providing apparatus;
- a storage section configured to store an IP addresses list of said plurality of backup apparatuses; and
- a processing section configured to receive registration of IP addresses from said terminal and said plurality of backup apparatuses through said communicating section, to notify the IP address of said first backup apparatus to said terminal through said communicating section in response to the registration of the IP address of said terminal,
- wherein said processing section notifies the IP address of said second backup apparatus as at least one substitution backup apparatus to said terminal through said communicating section when knowing a communication failure with said first backup apparatus,
- said processing section transmits said IP address list to said terminal through said communicating section in response to a request from said terminal based on detection of the communication failure with said first backup apparatus, and selects said second backup apparatus as said at least one substitution backup apparatus from among said plurality of backup apparatuses based on a check result of a response time of each of said plurality of backup apparatuses other than said first backup apparatus, to notify the IP address of said second backup apparatus to said terminal through said communicating section.

5. The service providing apparatus according to claim 4, wherein said service providing apparatus is a VoIP service providing apparatus in a VoIP telephony system.

6. The service providing apparatus according to claim 4, wherein each of said plurality of backup apparatuses has a same function as said service providing apparatus.

7. An address notifying method in a network system, comprising:
- holding an IP address of a service providing apparatus, and registering IP addresses of a terminal and a plurality of backup apparatuses containing first and second backup apparatuses on said service providing apparatus;
- notifying the IP addresses of said service providing apparatus and said first backup apparatus to said terminal in response to the registration of the IP address of said terminal such that the IP addresses of said service providing apparatus and said first backup apparatus are held by said terminal;
- providing a service from said service providing apparatus to said terminal in a normal operation;
- registering the IP address of said terminal on said first backup apparatus based on the IP address of said first backup apparatus to receive a service from said first backup apparatus, when a communication failure with said service providing apparatus has occurred;
- notifying the IP address of said second backup apparatus as at least one substitution backup apparatus from said service providing apparatus to said terminal when a communication failure with said first backup apparatus has occurred;
- holding the IP address of said second backup apparatus in place of the IP address of said first backup apparatus in said terminal;
- registering the IP address of said terminal on said second backup apparatus based on the IP address of said second backup apparatus to receive a service from said second backup apparatus, when the communication failure with said first backup apparatus has occurred;
- detecting the communication failure with said first backup apparatus by said terminal by communicating with said first backup apparatus periodically;
- notifying the detection of the communication failure with said first backup apparatus from said terminal to said service providing apparatus;
- transmitting an IP address list from said service providing apparatus to said terminal in response to the notice of the detection of the communication failure with said first backup apparatus, wherein said IP address list contains the IP addresses of a plurality of backup apparatuses including said first and second backup apparatuses;
- checking a response time of each of said plurality of backup apparatuses other than said first backup apparatus based on said IP address list;
- notifying the check result of the response times from said terminal to said service providing apparatus;
- selecting said second backup apparatus as at least one substitution backup apparatus from among said plurality of backup apparatuses in said service providing apparatus; and
- notifying the IP address of said second backup apparatus to said terminal.

8. The address notifying method according to claim 7, wherein said service providing apparatus belongs to a first LAN,
- said first and second backup apparatuses belong to second and third LANs, respectively, and connected with said first LAN through said WAN, and
- said terminal belongs to a fourth LAN connected with said first to third LAN through said WAN.

9. The address notifying method according to claim 8, wherein said service providing apparatus is a VoIP service providing apparatus in a VoIP telephony system.

10. A computer-readable recording medium encoded with a computer program, the computer program executed by the computer to perform an address notifying method, said method comprising:
- receiving registration of IP addresses from a terminal and a plurality of backup apparatuses which contain first and second backup apparatuses and each of which backs up at least a part of a function of said service providing apparatus;
- notifying the IP addresses of a service providing apparatus and said first backup apparatus to said terminal in response to the registration of the IP address of said terminal;
- notifying the IP address of said second backup apparatus as at least one substitution backup apparatus from said service providing apparatus to said terminal when knowing a communication failure with said first backup apparatus;
- transmitting an IP address list from said service providing apparatus to said terminal in response to a request from said terminal based on detection of the communication failure with said first backup apparatus, said IP address list containing the IP addresses of said plurality of backup apparatuses; and
- selecting said second backup apparatus as said at least one substitution backup apparatus from among said plurality of backup apparatuses based on a check result of a response time of each of said plurality of backup apparatuses other than said first backup apparatus, to notify the IP address of said second backup apparatus from said service providing apparatus to said terminal.

* * * * *